Oct. 18, 1960 — A. B. GRÖNBERG — 2,956,602
STRAW CUTTER FOR COMBINES
Original Filed Aug. 9, 1954 — 2 Sheets-Sheet 1

ANTON BERTIL GRÖNBERG
INVENTOR.

BY Cushman, Darby & Cushman
ATTORNEYS

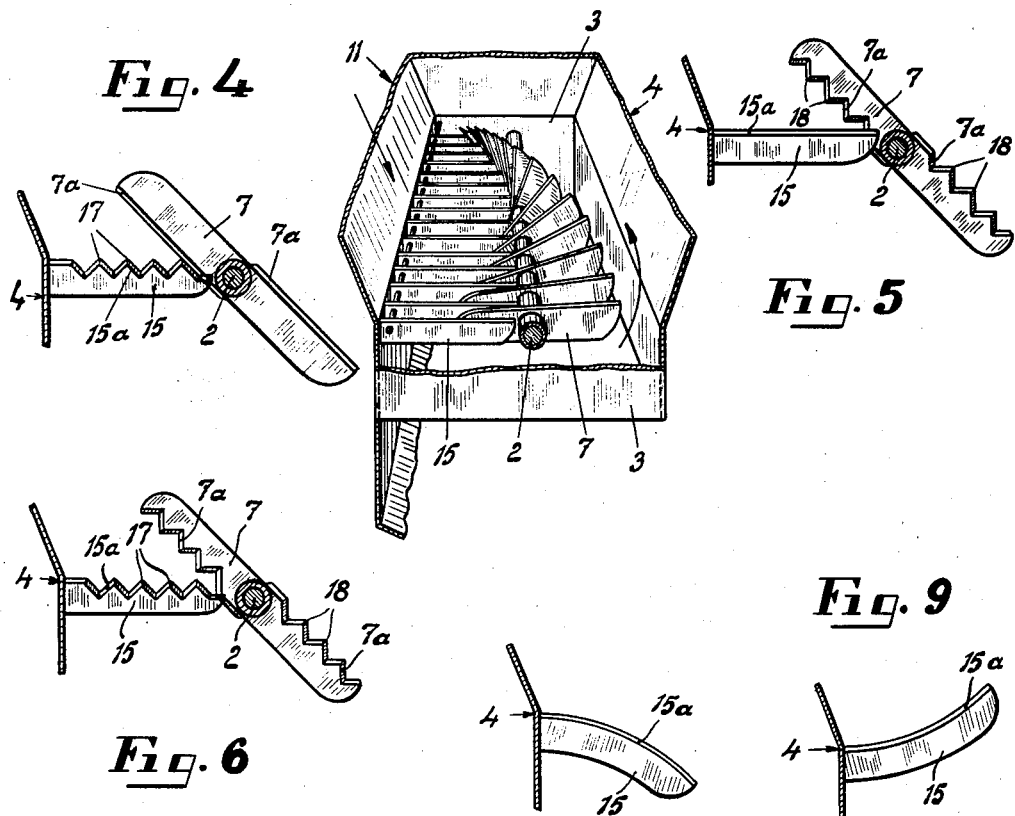

United States Patent Office 2,956,602
Patented Oct. 18, 1960

2,956,602

STRAW CUTTER FOR COMBINES

Anton Bertil Grönberg, Ottum, Sweden

Original application Aug. 9, 1954, Ser. No. 448,462, now Patent No. 2,862,536, dated Dec. 2, 1958. Divided and this application Jan. 14, 1958, Ser. No. 708,908

7 Claims. (Cl. 146—123)

This invention relates to a device for simultaneously cutting and crushing straw, green fodder and the like and is a division of the disclosures of application Serial No. 448,462, filed August 9, 1954, now Patent No. 2,862,536.

My invention relates to a device having in combination, a cutter housing for receiving straw, green fodder and the like from above, said housing having opened top and bottom and closed sides, a transversely disposed shaft rotatably mounted in the housing and having longitudinally spaced cutting blades, spaced grate arms extending into said housing, said blades arranged to pass between said arms when the shaft is rotated.

The primary object of my invention is to increase the cutting and crushing effect of the device of the art mentioned here above, and this object is obtained by providing the cutting blades with cutting edges at their foremost border in the direction of rotation of the shaft, and providing the grate arms with cutting edges at their upper border, said grate arms arranged in level with the cutter axis.

Another object of my invention is to prevent damage on the edges by stones or other firm objects eventually following the material to be cut and I have therefore made both the blades and the grate arms laterally flexible but longitudinally stiff.

I will now describe my invention in detail with reference had to the accompanying drawings, wherein:

Fig. 3 is a perspective view of the cutting device shown in Figs. 1 and 2, and

Figs. 4–10 show different embodiments of the cutting blades and the grate arms.

Figure 1:
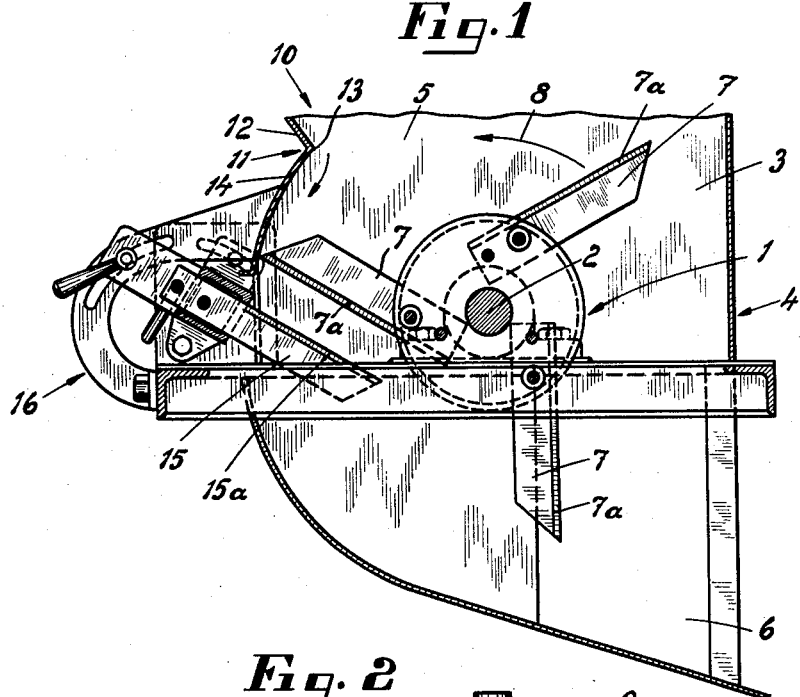
Fig. 1 is a vertical section through a device according to the invention.
Figure 2:
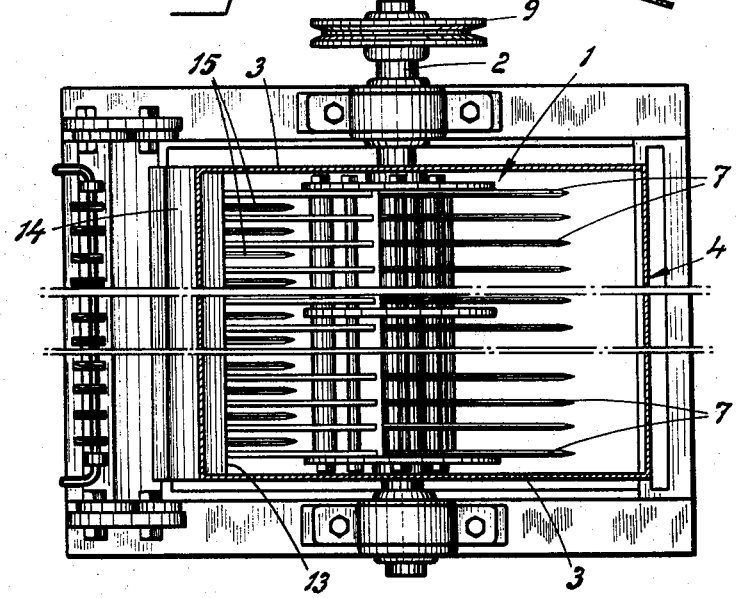
Fig. 2 is a partly broken view from above of the same.

The cutting device according to my invention comprises a cutter 1 which is journalled in a housing 4. The shaft 2 of the cutter 1 is carried on a frame at the outside of the end walls 3 of the housing 4 which is preferably manufactured of metal sheet. The housing 4 has further at its upper end an inlet opening 5 for receiving the material to be cut and an outlet opening 6 for the discharge of the cut and crushed material. A plurality of knives 7 are attached to the shaft 2 and arranged perpendicularly to the latter. These knives 7 are provided with ground edges 7a at their foremost border in the direction of rotation. The cutter runs in the direction indicated by the arrow 8 in Fig. 1, e.g. driven by a cone belt, acting on a driving pulley 9 which is arranged at one end of the shaft 2.

The wall 11 of the housing 4, situated to the left according to Fig. 1, is at its upper end formed with a feeding board 12 extending obliquely downwards towards the cutter 1. Said board 12 terminates in a sharp ridge 13, and the wall 11 continues in a curved portion 14 which extends preferably at a small distance, e.g. $\frac{1}{16}$"–$\frac{1}{8}$", from the outer end of the knives 7 and follows their path of rotation. Due to said ridge 13 such straw material which is fed downwards in its longitudinal direction on the board 12, when passing over the ridge, is turned in such a way that this straw material will thereafter be fed approximately horizontally downwards. Due to this small distance between the ends of the knives 7 and the wall portion 14, the material to be cut is fed uniformly downwards along this wall portion. A plurality of fixed arms 15 are arranged at level with the cutter 1, and their rear ends are carried in a holding device 16 which preferably is angularly adjustable. The arms 15 have upwardly directed edges 15a cooperating with the edges 7a of the knives 7. Moreover, the arms 15 are arranged in a row parallel to the cutter shaft 2 and each one of these knives 15 extends half-way between two blades 7 and the material is thus not only crushed but also torn and cut.

As shown in Fig. 3, the knives 7 may be arranged in progressive rotated position so as to form a helix.

With reference to Figs. 4–10 I will now describe different embodiments of the knives 7 and the arms 15.

As will be seen in Figs. 4–6, the edges of the knives 7 and/or the arms 15, intended to cooperate for the disintegration of the straw, the green fodder or the like, may be provided with teeth 17 and 18, respectively, obtained by grinding. The purpose of these teeth 17, 18 is to prevent the material from sliding along the arms 15 during the disintegrating operation. In Fig. 4 is shown a combination in which the arms 15 are provided with teeth 17 whereas the rotating knives have straight edges 7a. In Fig. 5 is shown a combination where the arms 15 have straight edges 15a and the rotating knives 7 are provided with teeth 18. It is, however, also possible, as shown in Fig. 6, to provide the knives 7 with teeth 18 and the arms 15 with teeth 17.

In Figs. 7–10 are shown further embodiment of the knives 7 and the arms 15 where the edges 7a, 15a follow curved lines perpendicular to the cutter shaft 2.

When using straight or curved knives 7 and arms 15 it is advisable to provide these details with a shoulder or something like that in order to prevent the material to be cut from sliding along the edges.

As already stated, the knives 7 as well as the arms 15 are preferably made laterally flexible but longitudinally stiff so as to prevent damage caused by stones or other firm objects which may follow the material to be cut.

It is to be understood that my device could be coupled to the rear end of a threshing machine below the straw discharge of the same.

In order to obtain a good cutting effect the cutter, having an outer diameter of about 2 feet, should rotate with about 1500 r./min.

When using the cutter for disintegrating green fodder, it is preferable to manufacture the housing 4 in such a way that there is an open space under the grate bars in which space cut material may fall down and is thereby prevented from being brought along with the cutter.

I claim:

1. In combination: a cutter housing for receiving straw, green fodder and like material from above, said housing having an opened top and bottom, and closed sides; a transversely disposed shaft rotatably mounted in said housing and having axially spaced elongated cutting blades extending nonradially therefrom; a plurality of spaced grate arms arranged in said housing along a line parallel to and substantially laterally opposite said shaft, each of said grate arms extending inwardly of said housing at an angle to the axis of said shaft and disposed half-way between adjacent cutting blades, said grate arms and said cutting blades each extending substantially across the path of the material to be cut thereby and each being flexible transversely of said housing, said cutting blades having edges at their foremost border in the direction of rotation of said shaft and said grate arms having cutting edges on their upper border; whereby upon rotation of said shaft said cutting blades with their free ends foremost cross the cutting edges of said parallel grate arms with the outer ends of said cutting knives being stabilized by the material to be cut.

2. The combination, as called for in claim 1, in which said grate arms are arranged substantially level with the cutter axis and have cutting edges at their upper borders, said edges of the cutting blades forming an arc of a circle.

3. The combination, as called for in claim 1, in which said grate arms are arranged substantially level with the cutter axis and having cutting edges at their upper borders, said edges of the grate arms forming an arc of a circle.

4. The combination, as called for in claim 1, in which the edges of the cutting blades and grate arms are curved and each forms an arc of a circle.

5. The combination, as called for in claim 1, in which said grate arms are arranged substantially level with the cutter axis and have cutting edges at their upper borders, said edges of the cutting blades being provided with teeth.

6. The combination, as called for in claim 1, in which said grate arms are arranged substantially level with the cutter axis and have cutting edges at their upper borders, said edges of the grate arms being provided with teeth.

7. The combination, as called for in claim 1, in which said grate arms are arranged substantially level with the cutter axis and have cutting edges at their upper borders, said edges of the cutting blades and the edges of the grate arms being provided with teeth.

References Cited in the file of this patent

UNITED STATES PATENTS

| | | |
|---|---|---|
| 83,048 | Doane | Oct. 13, 1868 |
| 185,012 | Bellinger | Dec. 5, 1876 |
| 919,499 | Ulery | Apr. 27, 1909 |
| 2,281,846 | Klein | May 5, 1942 |

FOREIGN PATENTS

| | | |
|---|---|---|
| 126,170 | Austria | Jan. 11, 1932 |
| 1,055,469 | France | Oct. 14, 1953 |